Aug. 9, 1932.  O. U. ZERK  1,870,433
LUBRICATING APPLIANCE
Filed Oct. 21, 1929
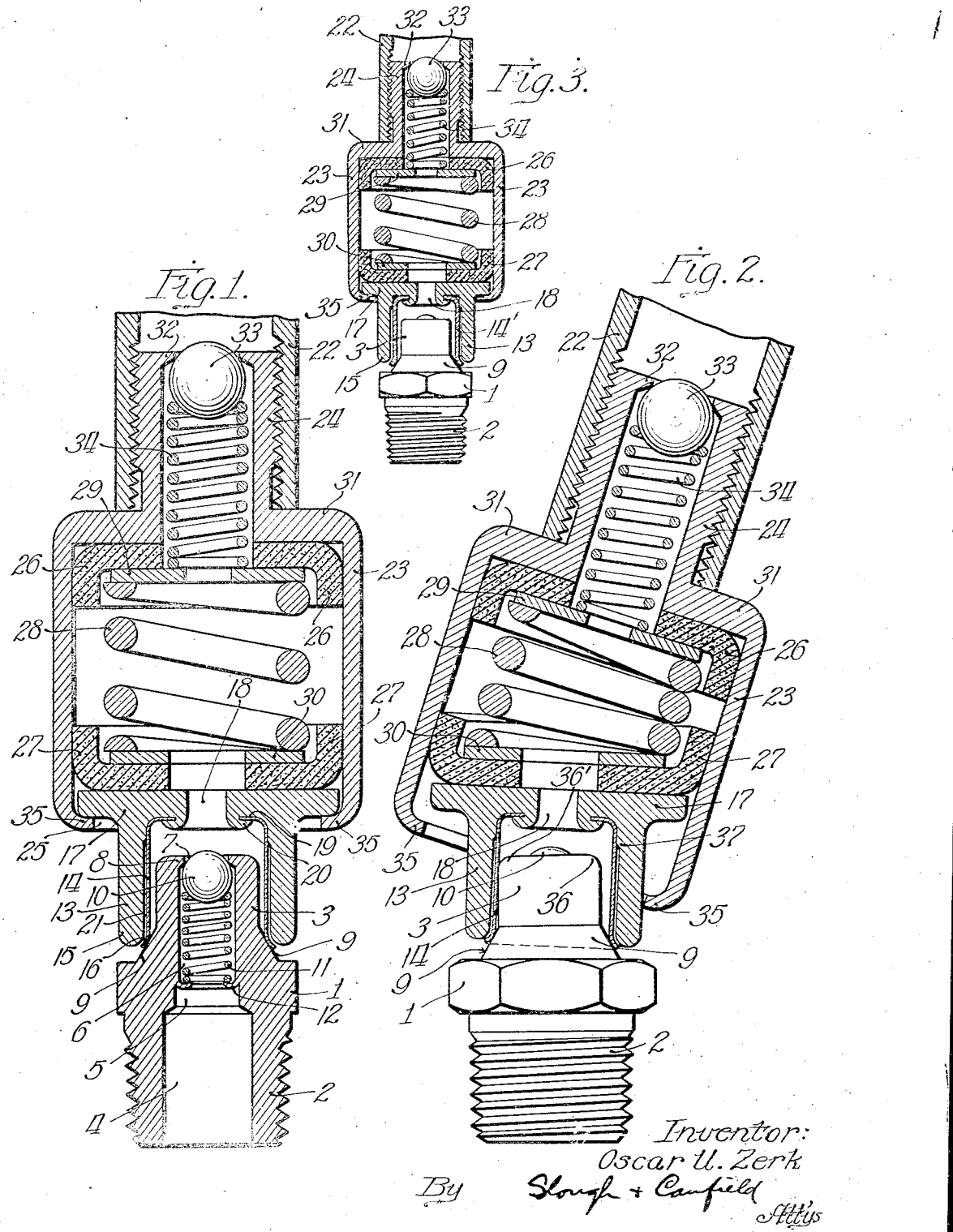
Inventor:
Oscar U. Zerk
By Slough & Canfield
Attys Patented Aug. 9, 1932

1,870,433

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPLIANCE

Application filed October 21, 1929. Serial No. 401,274.

My invention relates to lubricating appliances, and more particularly relates to lubricating appliances of the class adapted for the communication of lubricant under pressure from a lubricant gun, or other source of lubricant under pressure, to bearings of mechanisms, such as the chassis bearings of automotive vehicles, the bearings of industrial machines, and the like.

In the lubrication of such bearings two general types of apparatus are commonly used: First, apparatus of the interlocking type wherein a separable coupling is employed for the purpose of temporarily relatively rigidly interlocking a nozzle of the lubricant dispensing apparatus, such as a lubricating gun, with a lubricant receiving nipple which is installed on an element of the bearing to be lubricated; second, apparatus of the contact type, wherein the nozzle and nipple are not substantially rigidly interlocked, but are simply held in lubricant communicating contact by manual effort exerted to press the nozzle against the nipple. The lubricating appliances of my present invention are of the contact type.

In lubricating appliances of the contact type which have been previously commonly used, difficulty has been experienced due to the impossibility of providing, in the quantity production of the appliances, a suitably formed parti-spherical contact surface for one of the coupler elements capable of effecting a leakproof contact with a peripheral edge of the nipple.

Also, the nipple contact edge has been greatly susceptible to deformation, both during the manufacturing processes, the handling of the nipple after making, and the striking of the said surfaces by extraneous objects, both before and after installation of the nipples, on bearings to be lubricated, inevitably occurs, injuring, deleteriously, said surfaces, because of their disposition at the anteriorly disposed end edge of the nipple.

In my copending application, Serial No. 396,352, filed September 30, 1929, some of the difficulties attending the production and use of such prior lubricating appliances is more fully discussed, and in the said application, I have proposed improvements in nozzle and nipple construction, wherein, first, the annular contact surface of the nipple is disposed in a relatively protected position, and, second, wherein but a limited variation in the relative angular positions of the nozzle and nipple, is required under the conditions of use therein provided for.

In the said copending application, also, supplementary means associated with the nozzle adapted in use to be disposed closely adjacent the nipple are provided to effect such greater angularity of the lubricant gun and nipple as is sometimes required.

The apparatus of my present invention involves improvements whereby greater variations in the form of the lubricant sealing contact surface of the nipple may be had while a substantially leakproof contact is maintained therewith by the nozzle element, and wherein greater relative angularity between the axes of the nozzle and nipple may be provided for. Also herein a novel form of said supplementary associated means for the nozzle for effecting greater angularity between the lubricant gun and the nipple than may advantageously be had between the nozzle per se and the nipple.

An object of my invention, therefore, is to provide an improved lubricant dispensing nozzle for a lubricating nipple of the contact type adapted to effect good lubricant sealing contact with the contact surface of the nipple even though such surface is of slightly out-of-round form.

Another object of my invention is to provide an improved lubricant dispensing nozzle for a lubricating nipple of the contact type adapted to effect good lubricant sealing contact with the contact surface of the nipple even under conditions involving a not inconsiderable relative angularity in the positions of the nozzle and the nipple.

Another object of my invention is to provide an improved lubricant dispensing apparatus including a nozzle of improved form for a lubricating mechanism.

Another object of my invention is to provide an improved nozzle for a lubricant dispensing apparatus.

Another object of my invention is to provide an improved lubricant coupler, employing a nipple contact surface disposed in a protected position.

Another object of my invention is to provide an improved form of lubricant communicating universal joint for a lubricating nozzle.

Another object of my invention is to provide an improved highly efficient form of lubricating coupling involving separable nozzle and nipple elements.

Another object of my invention is to provide an improved highly efficient form of lubricating coupling involving separable nozzle and nipple elements, wherein yieldable elements of one of said elements responding to variations in form of different specimens of the other element, compensates therefore to effect in each case a good lubricant sealing contact between the nozzle and the engaged nipple element.

Other objects of my invention and the invention itself will be apparent from the following description of certain embodiments of my invention, wherein reference is made to the accompanying drawing illustrating the said embodiments.

In the drawing:

Fig. 1 is a longitudinal medial sectional view of an embodiment of my invention, comprising axially aligned nozzle and nipple elements and a supplemental universal joint mechanism joining the nozzle to a lubricant compressor;

Fig. 2 is a view like that of Fig. 1, but showing the same apparatus in a variant relatively angular relationship; and Fig. 3 is a like view of another embodiment of my invention having elements functionally corresponding to those of the other figures.

Referring now, first, to the embodiment of my invention illustrated in Figs. 1 and 2, at 3 I show a tubular inlet for a lubricating nipple adapted to be screw threaded by a tubular stem portion 2 into a recess of an element of bearing to which the nipple is adapted to convey lubricant under pressure.

The nipple is provided with a relatively enlarged hexagonal waist 1 adapted for engagement by a wrench for turning the nipple to place, in said bearing element recess, or for removal therefrom.

The tubular inlet 3 is preferably provided with substantially cylindrical outer walls which merge with the exteriorly inclined annular walls 9 of a tubular portion of the nipple intermediate the inlet end having cylindrical outer walls and the waist 1.

The nipple is provided with a stepped longitudinal through bore having successively reduced portions 4, 5 and 6 proceeding from the stem bore toward the inlet opening 7 at the tip of the inlet, and which opening is defined by the inner edge of an inturned flange 8 of the tubular inlet at the end of its bore.

A valve ball 10 is spring pressed to seating engagement against the flange 8 by a helical spring 11 interposed between the ball and an annular shoulder 12 disposed within the bore of the waist, projected inwardly from the bore walls thereof.

The annular longitudinally inclined surface 9 forming a nozzle engaging lubricant sealing contact surface, while susceptible to considerable variation in its longitudinal form, is herein shown as being in the form of an outer surface of a cone frustrum, and is hereinafter referred to as being of frustro-conical form.

The annular contact surface 9 is recessed, relative to the tip of the inlet 3, and the periphery of the waist, which waist, and the peripheral portion of the inlet engage with particles, striking the nipple and prevent contact thereof with said surface.

For association with nipples which may be of the form herein illustrated and above described, I provide a mechanism for dispensing lubricant thereto including nozzle having substantially tubular preferably rigid outer walls 13 and preferably approximately coaxial relatively resilient inner tubular walls 14, which may be spaced, as shown at 21, slightly inwardly from the walls 13 particularly adjacent the more forwardly disposed ends 15 and 16, respectively of the rigid and resilient relatively coaxial spaced walls.

The tubular walls 13 and 14 both project from a supporting disc 17 having a centrally disposed lubricant communicating opening 18, the rigid walls 13 being preferably integral with the said disc and the walls 14 terminating in an inturned radial flange portion 19, which is rigidly secured to the disc by a headed-over tubular projection 20 thereof.

A substantially universal joint connector for joining the tubular nozzle to the source of lubricant under pressure, indicated herein merely by the end fragment 22 of a lubricant compressor, said connector including a universal joint casing 23 screw threaded by a stem 24 into the tubular end of the compressor supports the nozzle by its supporting disc 17 with the coaxially disposed tubular nozzle elements 13 and 14 loosely projected through an opening 25 in a forwardly disposed flange 35 of the casing 23.

Within the casing 23 I provide a pair of oppositely disposed, centrally apertured cup leather packings 26 and 27 with an interposed helical spring 28 continuously exerting pressure through interposed apertured metal discs 29 and 30, respectively, upon inturned radial flanges of the packings 26 and 27.

The peripheral wall of the casing 23 is cylindrical in form, and tubular flanges of the packings 26 and 27 are disposed in close fitting engagement against the inner surface of said cylindrical casing wall, with inturned radial flange portions of the packings 26 and 27 spring pressed tightly against the inner surfaces, respectively, of an annular end wall portion 31 of the casing and of the nozzle supporting disc 17.

The reduced tubular stem 24 of the connector casing is provided with an inturned end flange 32 forming a valve seat for an interiorly disposed valve ball 33 spring pressed to its seat by a helical spring 34 interposed between said ball and the disc 29. The exterior diameter of the nozzle supporting disc 17 is preferably somewhat less than the contiguous cylindrical walls of the casing.

The flange 35 of the casing comprises an inturned annular projection of the forward end of its cylindrical walls and forms by its inner surface a seat for the outer annular surface of the supporting disc 17, which projects laterally of its junction with the tubular nozzle element 13.

The lubricating sealing element 21 having the radial flange 19 by which it is rigidly supported on the nozzle supporting disc 17 within the tubular walls 13 forming a tubular flange of the disc, is preferably in the form of a metallic cup having an apertured end wall 19 through which lubricant is communicated to the interior of the cup, said cup having intermediate preferably cylindrical walls, terminating preferably in an annular divergent forwardly disposed end, which comprises, the outer rim of the cup.

In the embodiment of my invention illustrated in Figs. 1 and 2, I contemplate making the nozzle sealing element 14 of a relatively resilient material, such as steel, brass, aluminum bronze, or the like, and which is sufficiently resilient that when the open annular end 16 of its tubular walls is pressed longitudinally over the nipple inlet, in engagement with the longitudinally inclined contacting surface 9 of the nipple, the resulting wedging engagement will effect a circumferential stretching of the resilient annular end of said thin walled tubular sealing element 14, and will subsequently retract to normal unstretched form by virtue of its inherent resiliency.

Also, by virtue of the fact that the walls of tubular element 14 are relatively thin and inherently resilient, they are susceptible to flexure to accommodate any reasonable amount of departure of the engaged portion of the surface 9 of the nipple from precisely annular form, the engaging surface of the nozzle element 14, in each case, being deflected to conform with the form of such engaged portion of the inclined surface 9.

Therefore, the nozzle element 14 is susceptible to deformation, within the elastic limit of its material, to effect a good lubricant sealing contact with an annular wedge surface, such as 9, of a nipple, even though the nozzle elements 13 and 14 are tilted relative to the nipple inlet 3 and the contact surface 9 for the nipple, so as to effect a condition of considerable angularity between the axes of the tubular nozzle elements and of the nipple inlet.

The embodiment illustrated is, therefore, susceptible to a considerably greater range of relative angular positions of the nozzle and nipple, while maintaining good lubricant sealing contact therebetween, than would be the case if a relatively rigid nipple engaging nozzle were employed.

Fig. 2 illustrates a condition wherein considerable angularity may exist between the coaxial tubular nozzle elements 13 and 14 and the inlet 3 and contacting surface 9 of a lubricant receiving nipple. In Fig. 2 the parts are assumed to be in the relative positions which they may take under a given condition existing when the nozzle of a gun 22 is applied to a nipple and longitudinally directed pressure exerted upon the gun 22 to press the nozzle element 14 against the contacting surface 9 of the nipple.

The figure omits a showing of the lubricant and omits showing the valve balls of the connector and nipple unseated, but otherwise illustrates the relative positions assumed by the parts under such a condition of use as aforesaid.

The gun barrel terminating in the portion 22 is indicated as being disposed at a considerable angle to the axis of the nipple and longitudinal pressure angularly directed upon the nozzle element from the barrel has effected a tilting of the nozzle relative to the axis of the nipple. Further excessive tilting of the nozzle is prevented by engagement of the rounded annular forwardly disposed outer surface portion 36 of the nipple with a portion of the tubular nozzle element 14 disposed closely adjacent to the rigid backing portion 37 of the rigid nozzle element 13. However, the nozzle is susceptible to considerable angularity of its axis relative to the axis of the gun barrel 22 by virtue of the universal joint mechanism comprising the spring 28 and packings 26 and 27 disposed interiorly of the connector casing 23.

Fig. 2 illustrates the nozzle and connector casing disposed relatively angularly, the nozzle supporting disc 17 being lifted from annular seating engagement with the casing flange 35 and the spring 28 is compressed to a greater extent at one side than the other side, and in the figure there is illustrated a condition wherein the adjacent convolutions at one side of the spring are brought into relative contacting engagement while considerably separated at the other side of the spring.

Under the condition prevailing in Fig. 2, when the gun barrel 22 was tilted angularly to the nipple and before longitudinal pressure was exerted upon it directed toward the nipple, the nozzle, tilted in the same general direction as the gun barrel but to a more limited degree because of engagement at 36' with a lateral surface of the tubular nipple inlet. Upon sufficient longitudinal pressure exerted by the barrel upon the nozzle to establish a good lubricant sealing contact and to sufficiently compress lubricant in the barrel to discharge to the nipple through its inlet opening 7, the nipple will commonly be oppositely tilted to take the position shown.

Such successive tilting movements of the nozzle relative to the nipple will effect a scraping, dirt cleaning action on the surface 9 of the nipple. The lubricant in the connector casing intermediate the cup packings 26 and 27, being under high pressure, will effect sealing pressure against the packings to make good lubricant sealing contact by the packings with the engaged walls of the connector and nozzle supporting disc.

During all positions of the nozzle relative to the nipple, which are possible within the range determined by the arrest of tilting movements effected by interengaging lateral surfaces, such as 36 and 36' of the nipple, with an interiorly disposed inner surface of the nozzle posteriorly spaced from its anterior contact surface, the susceptibility of the contact portions of the nozzle element 14 to deformation, by resiliently bending and by resilient stretching, effects a good lubricant sealing contact between the inner end surface of the nozzle element 14 and the nipple contact surface 9.

Fig. 3 illustrates a second embodiment of my invention otherwise like the embodiment of Figs. 1 and 2, except that the tubular nozzle sealing element 14' is made having relatively thicker walls of preferably softer and preferably metallic material. In the embodiment of Fig. 3, material for the element 14' need not be inherently so resilient as for the corresponding element 14 of the preceding embodiment, and I contemplate making the element 14' of soft brass, or in some cases, such materials as fibre may be used, the quality particularly desired in said embodiment being that of flexibility without the necessity of so great a degree of inherent resiliency.

Having thus described my invention in certain embodiments, I am aware that numerous and extensive departures may be made from the embodiments herein illustrated and described, but without departing from the spirit of my invention.

I claim:

1. In lubricating apparatus, a lubricant dispensing nozzle having a nipple inlet receiving recess at its end, a thin walled tube forming the lateral walls of the recess, said tube having lateral walls of inherently resilient material and adapted to make wedging engagement with an approximately annular inclined surface of the nipple, and resiliently deformable, to conform to the form of said engaged nipple surface.

2. A lubricating nozzle having a dispensing tubular outlet element of inherently resilient material telescopable over an approximately annular longitudinally inclined nipple surface and making wedging engagement therewith, said element having tubular walls so thin as to be substantially deformable to conform to noncircular portions of said nipple surface, to make manually maintainable pressure contact therewith.

3. In lubricating apparatus, the combination with a lubricating nipple, a nozzle for dispensing lubricant thereto, a thin walled dispensing tube for the nozzle of inherently resilient material, said nipple having a tubular inlet and a longitudinally inclined annular contact surface at the base of the inlet, engagable by an inner longitudinal surface of said tube.

4. In lubricating apparatus, the combination with a lubricating nipple, of a nozzle having a lubricant dispensing tube, said nipple having a tubular inlet of less diameter than the tube, telescopable entirely therein, and an approximately annular contact surface at the base of the inlet divergent therefrom, engageable by an end portion of the tube, the walls of the tube being thin and of inherently resilient material, and conformable to variations from annularity of the engaged contact surface of the nipple.

5. A sealing element comprising a dispensing outlet for a lubricating nozzle, of inherently resilient metallic material and having a thin tubular portion engageable with an approximately annular inclined surface of a nipple, and circumferentially expandable responsive to a thrust effort of the nozzle against said nipple surface.

6. A nozzle for a lubricant compressor having a contactor of inherently resilient metallic material, of tubular form, circumferentially expandable by pressure engagement with a longitudinally inclined nipple surface.

7. In combination, a nozzle for a lubricant compressor having a contactor of inherently resilient metallic material, of tubular form, and a nipple having a longitudinally inclined surface and an end portion projected longitudinally within the contactor, and whose engaged surface is other than of precisely annular form, the contactor being circumferentially deformed by pressure engagement with said inclined surface.

8. A connector of the contact type for dispensing lubricant between a supporting and another fitting of a lubricating system, having thin inherently resilient metallic tubular walls, engageable directly by an end with an approximately annular surface of said another fitting, and circumferentially deformable to fit said surface, responsive to a longitudinal thrust effort of the connector against the surface.

9. In a lubricating compressor, in combination, a lubricant dispensing nozzle, a connector joining the compressor and nozzle and adapted to communicate lubricant from a compressor to the nozzle, said connector comprising a casing, a pair of oppositely disposed packings of the cup leather type each having joined radial and tubular flanges, spring means compressively interposed between the radial flanges of the packings, one of said packings engageable by its radial flange with a posteriorly disposed end wall of the casing and by its tubular flange with lateral walls of the casing, said nozzle having a flanged end extending into the forward end of the casing and a tubular dispensing end projected from an opening in the forward wall thereof, and retained in the casing by engagement of its flanged end with an inner surface of said forward wall, the other packing engageable by its radial flange with the flanged end of the nozzle, and by its tubular flange with lateral walls of the casing.

10. In a lubricant compressor, in combination, a tubular connector supported by one end, a nozzle having a portion telescoped within the other end and engaged by a projection of the connector to prevent removal therefrom, and a tubular portion extending through an opening through said other end, for engagement with a lubricant receiving nipple, a packing of the cup leather type for effecting a lubricant seal between the telescoped portion of the nozzle and the lateral walls of the connector, and a spring for restraining inward telescoping movements of the nozzle in the connector.

11. In combination with a lubricant compressor, a nozzle therefor having a nipple engaging tubular contactor of inherently resilient metallic material, a nipple having a tubular inlet of slightly less diameter than the bore of the contactor, and adapted for reception therein, said nipple having an approximately annular contact surface at the base of its inlet, extending divergently therefrom and engageable by an end portion of the contactor, the walls of the contactor being so thin as to conform to variations from annularity of the said nipple contact surface, engaged thereby.

12. In a lubricant compressor, in combination, a nozzle therefor having a nipple engaging tubular contactor of inherently resilient metallic material, a nipple having a tubular inlet of slightly less diameter than the bore of the contactor, and adapted for reception therein, said nipple having an approximately annular contact surface at the base of its inlet, extending divergently therefrom and engageable by an end portion of the contactor, the walls of the contactor being so thin as to conform to variations from annularity of the said nipple contact surface, engaged thereby, and a lubricant communicating universal joint disposed substantially closely to the tip of the nipple inlet, intermediate said nozzle and said compressor.

13. A connector of the contact type for dispensing lubricant between a supporting and another fitting of a lubricating system, having resilient tubular walls engageable by an inner end portion directly with an outer approximately annular surface of said another fitting, and deformable to fit said surface, responsive to a thrust effort of the connector directed longitudinally thereof against said surface.

In testimony whereof I hereunto affix my signature this 19th day of October, 1929.

OSCAR U. ZERK.